United States Patent
Fowe

(10) Patent No.: US 10,198,941 B2
(45) Date of Patent: Feb. 5, 2019

(54) METHOD AND APPARATUS FOR EVALUATING TRAFFIC APPROACHING A JUNCTION AT A LANE LEVEL

(71) Applicant: HERE Global B.V., Eindhoven (NL)

(72) Inventor: James Fowe, Palatine, IL (US)

(73) Assignee: HERE Global B.V., Eindhoven (NL)

(*) Notice: Subject to any disclaimer, the term of this patent is extended or adjusted under 35 U.S.C. 154(b) by 70 days.

(21) Appl. No.: 15/221,147

(22) Filed: Jul. 27, 2016

(65) Prior Publication Data

US 2018/0033296 A1 Feb. 1, 2018

(51) Int. Cl.
| G08G 1/00 | (2006.01) |
| G08G 1/01 | (2006.01) |
| G08G 1/052 | (2006.01) |
| G01C 21/34 | (2006.01) |

(52) U.S. Cl.
CPC ....... *G08G 1/0133* (2013.01); *G01C 21/3415* (2013.01); *G01C 21/3492* (2013.01); *G08G 1/0129* (2013.01); *G08G 1/052* (2013.01)

(58) Field of Classification Search
CPC .... G08G 1/0133; G08G 1/0129; G08G 1/052; G01C 21/3492; G01C 21/3415
See application file for complete search history.

(56) References Cited

U.S. PATENT DOCUMENTS

| 8,014,937 B2 | 9/2011 | Smyth et al. |
| 8,452,771 B2* | 5/2013 | Kurciska ........... G06F 17/30241 |
| | | 701/423 |
| 2004/0034467 A1 | 2/2004 | Sampedro et al. |
| 2006/0089787 A1* | 4/2006 | Burr ................. G01C 21/3469 |
| | | 701/533 |
| 2008/0071465 A1* | 3/2008 | Chapman .......... G01C 21/3691 |
| | | 701/117 |

(Continued)

FOREIGN PATENT DOCUMENTS

| EP | 1 938 296 B1 | 7/2008 |
| EP | 2 278 573 A | 1/2011 |

(Continued)

OTHER PUBLICATIONS

Office Action for U.S. Appl. No. 15/221,112 dated Dec. 11, 2017, 20 pages.

(Continued)

*Primary Examiner* — Jason Holloway
(74) *Attorney, Agent, or Firm* — Alston & Bird LLP

(57) ABSTRACT

A method, apparatus and computer program product are provided to analyze the vehicular speeds along a link that approaches a junction at the lane level. In the context of a method, a plurality of clusters of vehicular speeds are identified from probe data along a first multi-lane link that approaches a junction. For a respective lane of traffic of the first link, the method determines a value associated with the traffic having a respective state of traffic flow from among the different states of traffic flow associated with the clusters of vehicular speeds along the respective lane of traffic of the first link. The method further includes repeatedly determining the value associated with the traffic having a respective state of traffic flow from among the different states of traffic flow associated with the clusters of vehicular speeds for each different lane of traffic of the first link.

22 Claims, 8 Drawing Sheets

(56) References Cited

U.S. PATENT DOCUMENTS

| | | | |
|---|---|---|---|
| 2012/0095682 A1 | 4/2012 | Wilson | |
| 2012/0173530 A1* | 7/2012 | Kurciska | G06F 17/30241 |
| | | | 707/738 |
| 2013/0275033 A1 | 10/2013 | Bastiaensen et al. | |
| 2013/0282264 A1 | 10/2013 | Bastiaensen et al. | |
| 2014/0278052 A1* | 9/2014 | Slavin | G01C 21/3492 |
| | | | 701/400 |
| 2014/0358841 A1* | 12/2014 | Ono | G08G 1/0112 |
| | | | 706/52 |
| 2015/0057913 A1 | 2/2015 | Benhammou | |
| 2015/0317900 A1* | 11/2015 | Tashiro | G01C 21/32 |
| | | | 701/117 |
| 2016/0004915 A1 | 1/2016 | Chen et al. | |

FOREIGN PATENT DOCUMENTS

| | | |
|---|---|---|
| WO | WO 2007/103180 A2 | 9/2007 |
| WO | WO 2008/021551 A2 | 2/2008 |
| WO | WO 2011/160039 A1 | 12/2011 |
| WO | WO 2012/089281 A1 | 7/2012 |
| WO | WO 2012/104392 A1 | 8/2012 |

OTHER PUBLICATIONS

Office Action for U.S. Appl. No. 15/142,336 dated May 4, 2017, 22 pages.

Notice of Allowance for U.S. Appl. No. 14/755,927 dated Dec. 22, 2016.

"A Driving Route Made Just for You" [online] [retrieved Apr. 15, 2015]. Retrieved from the Internet: <URL: http://www.technologyreview.com/news/425271/a-driving-route-made-just-for-you/>. (dated Aug. 30, 2011); 2 pages.

"A New Kind of Fundamental Diagram with an Application to Road Traffic Emission Modelling"; [online] [retrieved Aug. 10, 2015]. Retrieved from the Internet: http://www.researchgate.net/profile/Antoine_Tordeux/publication/259535754_A_new_kind_of_fundamental_diagram_with_an_application_to_road_traffic_emission_modeling/links/00b7d52cea5f2bede2000000.pdf. (dated Mar. 2014); pp. 1-23.

International Search Report and Written Opinion for International Application No. PCT/EP2016/063758 dated Oct. 7, 2016.

Office Action for U.S. Appl. No. 14/755,927 dated Jul. 18, 2016.

U.S. Appl. No. 14/755,927, by inventor Fowe et al., entitled "Method and Apparatus for Identifying a Bi-Modality Condition Upstream of Diverging Road Segments," filed Jun. 30, 2015.

U.S. Appl. No. 15/142,336, by inventor Fowe et al., entitled "Method and Apparatus for Identifying a Split Lane Traffic Location," filed Apr. 19, 2016.

Wang, Zuchao, et al.; "Visual Traffic Jam Analysis Based on Trajectory Data"; IEEE Transactions on Visualization and Computer Graphics; vol. 19, No. 12; Dec. 2013; pp. 2159-2168.

Speeded Up Robust Features—Wikipedia [online] [retrieved Nov. 30, 2016]. Retrieved from the Internet: <URL:https://en.wikipedia.org/wiki/Speeded_up_robust_features>, 4 pages.

Viterbi Algorithm—Wikipedia [online] [retrieved Nov. 30, 2016]. Retrieved from the Internet: <URL:https://en.wikipedia.org/wiki/Viterbi_algorithm>. 9 pages.

Canny Edge Detector—Wikipedia [online] [retrieved Nov. 30, 2016]. Retrieved from the Internet: <URL:https://en.wikipedia.org/wiki/Canny_edge_detector>. 6 pages.

\* cited by examiner

| Link | Mean-Based | Viterbi |
|---|---|---|
| 1 | G | G |
| 2 | G | G |
| 3 | G | G |
| 4 | G | G |
| 5 | G | G |
| 6 | Y | G |
| 7 | G | G |
| 8 | G | G |
| 9 | G | G |
| 10 | G | G |
| 11 | G | G |

Figure 8a

| Link | Mean-Based | Viterbi |
|---|---|---|
| 1 | Y | G |
| 2 | G | G |
| 3 | G | Y |
| 4 | Y | R |
| 5 | Y | R |
| 6 | Y | R |
| 7 | Y | Y |
| 8 | G | G |
| 9 | G | G |
| 10 | G | G |
| 11 | Y | Y |

Figure 8b

METHOD AND APPARATUS FOR EVALUATING TRAFFIC APPROACHING A JUNCTION AT A LANE LEVEL

TECHNOLOGICAL FIELD

An example embodiment relates generally to the evaluation of traffic flow approaching a junction, such as an intersection and, more particularly, to a method, apparatus and computer program product for providing a lane level evaluation of the traffic approaching a junction.

BACKGROUND

Vehicular traffic approaching a junction, such as an intersection or a split at which an entrance ramp or an exit ramp merge with a highway or the like, may frequently have a wide variety of speeds. With respect to a roadway having multiple lanes that approaches an intersection, the vehicles traveling along the center lane(s) that proceed directly through the intersection generally have a relatively high speed, while vehicles traveling in the rightmost lane that make a right turn at the intersection may have an intermediate speed and vehicles traveling in the leftmost lane that make a left turn at the intersection may have a relatively slower speed. Thus, the distribution of vehicular speeds along the roadway approaching a junction may be multimodal with multiple clusters of vehicular speeds. With respect to the foregoing example of traffic approaching an intersection along a multi-lane roadway, there may be a first cluster of relatively high vehicular speeds, a second cluster of intermediate vehicular speeds and a third cluster of relatively slow vehicular speeds.

For purposes of routing and navigation, vehicular speeds along the link of a roadway that approaches a junction are generally averaged with the resulting average speed then being utilized for route planning including the identification of the fastest route and for the determination of an estimated time of arrival. Because of the sometimes significant differences in the speed of vehicles approaching a junction as exemplified by the multi-modal distribution of vehicular speeds, reliance upon an average speed may produce less accurate results in terms of routing and navigation than may be desired. For example, the utilization of an average speed from a multi-modal distribution of vehicular speeds along the link of a roadway approaching a junction may result in the generation of inaccurate traffic information for the link, thereby potentially leading to an indication that falsely indicates that a link is congested or a failure to detect congestion.

Although the multi-modal distribution of vehicular speeds along a link of a roadway approaching a junction may be attributable to the different speeds that the vehicles are able to travel in the different lanes of the link, current techniques for identifying the position of the vehicle during travel along the roadway are unable to consistently identify the particular lane in which the vehicle is located and, instead, simply identifies the link of the roadway along which the vehicle is traveling. Thus, the vehicle and, in turn, the speed of a vehicle traveling along the link of a roadway approaching a junction is associated with the link in general and not with a respective lane of the link. As such, routing and navigation systems are unable to discriminate between the expected travel time for vehicles driving in the different lanes of a link of a roadway approaching a junction and, as such, analyze the speed of the vehicles traveling along the link of the roadway approaching a junction in the aggregate which, in turn, leads to inaccurate traffic information in some instances.

BRIEF SUMMARY

A method, apparatus and computer program product are provided in accordance with an example embodiment in order to analyze the vehicular speeds along a link that approaches a junction at the lane level. As such, the different clusters of vehicular speeds along a link that approaches a junction and the respective states of traffic flow represented by the different clusters of vehicular speeds may be associated with respective lanes of the link approaching the junction. Thus, routing and navigation systems need not rely upon an average speed of vehicles approaching a junction but can, instead, analyze the vehicular speed at the lane level such that the resulting route planning, including the identification of a fastest route, and the determination of the estimated time of arrival may be provided with more accuracy. Additionally, the routes of autonomous vehicles may be defined with more precision in advance of the approach of an autonomous vehicle to a junction such that the autonomous vehicle may be positioned within a desired lane of the link of the roadway approaching the junction to facilitate the intended route of the autonomous vehicle and to reduce or minimize the impact of the autonomous vehicle upon other drivers.

In an example embodiment, a method is provided that includes identifying a plurality of clusters of vehicular speeds from probe data along a first link that approaches a junction at which the first link splits into two or more second links. The first link includes two or more lanes of traffic. The clusters of vehicular speeds are associated with different states of traffic flow along the first link. For a respective lane of traffic of the first link, the method also includes determining a value associated with the traffic having a respective state of traffic flow from among the different states of traffic flow associated with the clusters of vehicular speeds along the respective lane of traffic of the first link. The value may be determined by utilizing a Viterbi algorithm. The method determines the value by determining an emission probability of observing vehicular speeds y along the respective lane of traffic of the first link in an instance in which the state of traffic flow along the respective lane of traffic of the first link is state k and by determining the value associated with the state of traffic flow along the respective lane of traffic of the first link based upon a combination of the emission probability, a state transition probability and the value associated with the state of traffic flow along a respective lane of traffic of a link, upstream of the first link. The method further includes repeatedly determining the value associated with the traffic having a respective state of traffic flow from among the different states of traffic flow associated with the clusters of vehicular speeds for each different lane of traffic of the first link.

The method of an example embodiment determines the emission probability by determining the emission probability based upon a probability that the state of traffic flow along the respective lane of traffic of the first link is state k given the probe data, a probability of observing the vehicular speeds from the probe data along the respective lane of traffic of the first link and a historical probability the state of traffic flow along the respective lane of traffic of the first link is state k at a time epoch corresponding to the time epoch during which the probe data was collected. The state transition probability of an example embodiment defines a probability of a change in state from a state of traffic flow along a corresponding lane of a link, upstream of the first link, to state k representative of the traffic flow along the respective lane of traffic of the first link. In an example embodiment, the value associated with the state of traffic flow along the respective lane of traffic of a link, upstream of the first link, includes the value associated with the state of traffic flow along the respective lane of traffic of the link immediately upstream of the first link.

The method of an example embodiment also includes representing the traffic flow along the respective lane of the first link and corresponding lanes of the two or more second links by a Hidden Markov Model. In this example embodiment, the method determines the value associated with the traffic having a respective state of traffic flow along the respective lane of traffic of the first link based upon the Hidden Markov Model. The first and second links may be members of a set of sequential links extending from an initial link to a final link. In this example embodiment, the method further includes determining, for a respective lane of traffic of the initial link, a value associated with the traffic having a respective state of traffic flow along the respective lane of traffic of the initial link by determining an emission probability of observing vehicular speeds y along the respective lane of traffic of the initial link in an instance in which the state of traffic flow along the respective lane of traffic of the initial link is state k and by determining the value associated with the state of traffic flow along the respective lane of traffic of the initial link based upon a combination of the emission probability and an initial probability $\pi_k$ of the state of traffic flow along the respective lane of traffic of the initial link being state k.

In another example embodiment, an apparatus is provided that includes at least one processor and at least one memory including computer program instructions with the at least one memory and the computer program instructions, with the at least one processor, causing the apparatus at least to identify a plurality of clusters of vehicular speeds from probe data along a first link that approaches a junction at which the first link splits into two or more second links. The first link includes two or more lanes of traffic. The clusters of vehicular speeds are associated with different states of traffic flow along the first link. For a respective lane of traffic of the first link, the at least one memory and the computer program instructions, with the at least one processor, also cause the apparatus to determine a value associated with the traffic having a respective state of traffic flow from among the different states of traffic flow associated with the clusters of vehicular speeds along the respective lane of traffic of the first link. The value may be determined by utilizing a Viterbi algorithm. The at least one memory and the computer program instructions, with the at least one processor, cause the apparatus to determine the value by determining an emission probability of observing vehicular speeds y along the respective lane of traffic of the first link in an instance in which the state of traffic flow along the respective lane of traffic of the first link is state k and by determining the value associated with the state of traffic flow along the respective lane of traffic of the first link based upon a combination of the emission probability, a state transition probability and the value associated with the state of traffic flow along a respective lane of traffic of a link, upstream of the first link. The at least one memory and the computer program instructions, with the at least one processor, further cause the apparatus to repeatedly determine the value associated with the traffic having a respective state of traffic flow from among the different states of traffic flow associated with the clusters of vehicular speeds for each different lane of traffic of the first link.

The at least one memory and the computer program instructions, with the at least one processor, cause the apparatus of an example embodiment to determine the emission probability by determining the emission probability based upon a probability that the state of traffic flow along the respective lane of traffic of the first link is state k given the probe data, a probability of observing the vehicular speeds from the probe data along the respective lane of traffic of the first link and a historical probability the state of traffic flow along the respective lane of traffic of the first link is state k at a time epoch corresponding to the time epoch during which the probe data was collected. The state transition probability of an example embodiment defines a probability of a change in state from a state of traffic flow along a corresponding lane of a link, upstream of the first link, to state k representative of the traffic flow along the respective lane of traffic of the first link. In an example embodiment, the value associated with the state of traffic flow along the respective lane of traffic of a link, upstream of the first link, includes the value associated with the state of traffic flow along the respective lane of traffic of the link immediately upstream of the first link.

The at least one memory and the computer program instructions, with the at least one processor, cause the apparatus of an example embodiment to represent the traffic flow along the respective lane of the first link and corresponding lanes the two or more second links by a Hidden Markov Model. In this example embodiment, the at least one memory and the computer program instructions, with the at least one processor, cause the apparatus to determine the value associated with the traffic having a respective state of traffic flow along the respective lane of traffic of the first link based upon the Hidden Markov Model. The first and second links may be members of a set of sequential links extending from an initial link to a final link. In this example embodiment, the at least one memory and the computer program instructions, with the at least one processor, cause the apparatus to determine, for a respective lane of traffic of the initial link, a value associated with the traffic having a respective state of traffic flow along the respective lane of traffic of the initial link by determining an emission probability of observing vehicular speeds y along the respective lane of traffic of the initial link in an instance in which the state of traffic flow along the respective lane of traffic of the initial link is state k and by determining the value associated with the state of traffic flow along the respective lane of traffic of the initial link based upon a combination of the emission probability and an initial probability $\pi_k$ of the state of traffic flow along the respective lane of traffic of the initial link being state k.

In a further example embodiment, a computer program product is provided that includes at least one non-transitory computer-readable storage medium bearing computer program instructions embodied therein for use with a computer. The computer program instructions include program instructions which, when executed, cause the computer at least to identify a plurality of clusters of vehicular speeds from probe data along a first link that approaches a junction at which the first link splits into two or more second links. The first link includes two or more lanes of traffic. The clusters of vehicular speeds are associated with different states of traffic flow along the first link. For a respective lane of traffic of the first link, the computer program instructions also include program instructions for determining a value associated with the traffic having a respective state of traffic flow from among the different states of traffic flow associated with the clusters of vehicular speeds along the respective lane of traffic of the first link. The value may be determined by utilizing a Viterbi algorithm. The program instructions for determining the value include program instructions for determining an emission probability of observing vehicular speeds y along the respective lane of traffic of the first link in an instance in which the state of traffic flow along the respective lane of traffic of the first link is state k and program instructions for determining the value associated with the state of traffic flow along the respective lane of traffic of the first link based upon a combination of the emission probability, a state transition probability and the value associated with the state of traffic flow along a respective lane of traffic of a link, upstream of the first link. The computer program instructions further include program instructions for repeatedly determining the value associated with the traffic having a respective state of traffic flow from among the different states of traffic flow associated with the clusters of vehicular speeds for each different lane of traffic of the first link.

In an example embodiment, the program instructions for determining the emission probability include program instructions for determining the emission probability based upon a probability that the state of traffic flow along the respective lane of traffic of the first link is state k given the probe data, a probability of observing the vehicular speeds from the probe data along the respective lane of traffic of the first link and a historical probability the state of traffic flow along the respective lane of traffic of the first link is state k at a time epoch corresponding to the time epoch during which the probe data was collected. The state transition probability of an example embodiment defines a probability of a change in state from a state of traffic flow along a corresponding lane of a link, upstream of the first link, to state k representative of the traffic flow along the respective lane of traffic of the first link. In an example embodiment, the value associated with the state of traffic flow along the respective lane of traffic of a link, upstream of the first link, includes the value associated with the state of traffic flow along the respective lane of traffic of the link immediately upstream of the first link.

The computer program instructions of an example embodiment also include program instructions for representing the traffic flow along the respective lane of the first link and corresponding lanes of the two or more second links by a Hidden Markov Model. In this example embodiment, the program instructions for determining the value associated with the traffic having a respective state of traffic flow along the respective lane of traffic of the first link utilize the Hidden Markov Model. The first and second links may be members of a set of sequential links extending from an initial link to a final link. In this example embodiment, the computer program instructions also include program instructions for determining, for a respective lane of traffic of the initial link, a value associated with the traffic having a respective state of traffic flow along the respective lane of traffic of the initial link. In this regard, the program instructions for determining the value for a respective lane of traffic of the initial link include program instructions for determining an emission probability of observing vehicular speeds y along the respective lane of traffic of the initial link in an instance in which the state of traffic flow along the respective lane of traffic of the initial link is state k and program instructions for determining the value associated with the state of traffic flow along the respective lane of traffic of the initial link based upon a combination of the emission probability and an initial probability $\pi_k$ of the state of traffic flow along the respective lane of traffic of the initial link being state k.

In yet another example embodiment, an apparatus is provided that includes means for identifying a plurality of clusters of vehicular speeds from probe data along a first link that approaches a junction at which the first link splits into two or more second links. The first link includes two or more lanes of traffic. The clusters of vehicular speeds are associated with different states of traffic flow along the first link. For a respective lane of traffic of the first link, the apparatus also includes means for determining a value associated with the traffic having a respective state of traffic flow from among the different states of traffic flow associated with the clusters of vehicular speeds along the respective lane of traffic of the first link. The value may be determined by utilizing a Viterbi algorithm. The means for determining the value include means for determining an emission probability of observing vehicular speeds y along the respective lane of traffic of the first link in an instance in which the state of traffic flow along the respective lane of traffic of the first link is state k and means for determining the value associated with the state of traffic flow along the respective lane of traffic of the first link based upon a combination of the emission probability, a state transition probability and the value associated with the state of traffic flow along a respective lane of traffic of a link, upstream of the first link. The apparatus further includes means for repeatedly determining the value associated with the traffic having a respective state of traffic flow from among the different states of traffic flow associated with the clusters of vehicular speeds for each different lane of traffic of the first link.

BRIEF DESCRIPTION OF THE DRAWINGS

Figure 1:
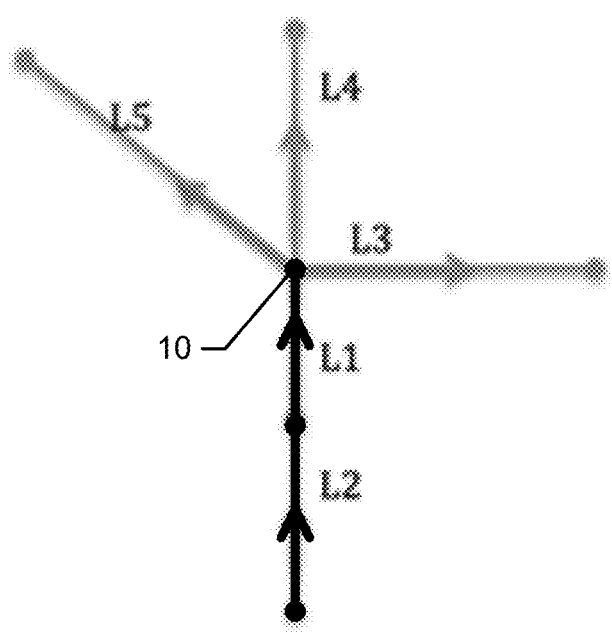
Figure 2:
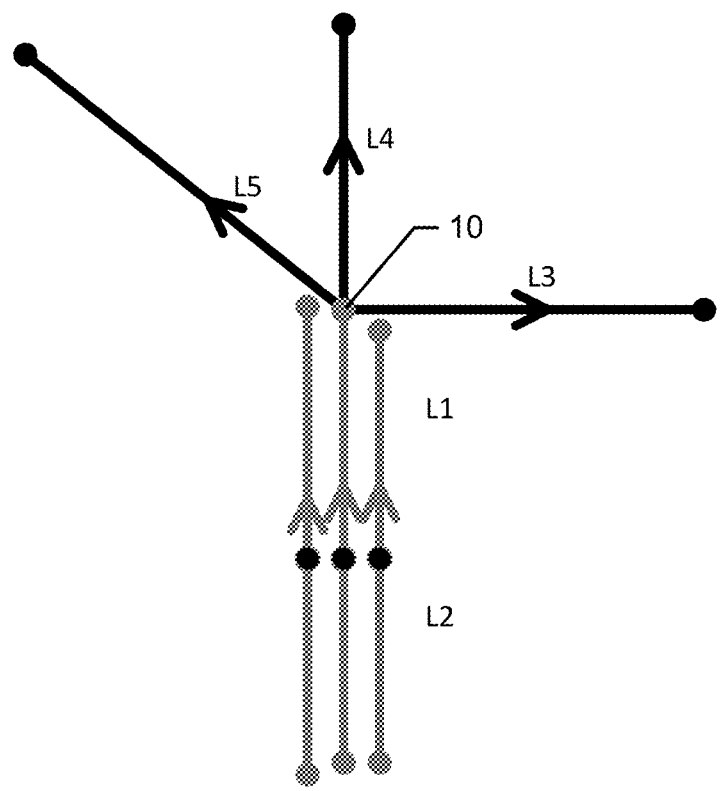
Figure 3:
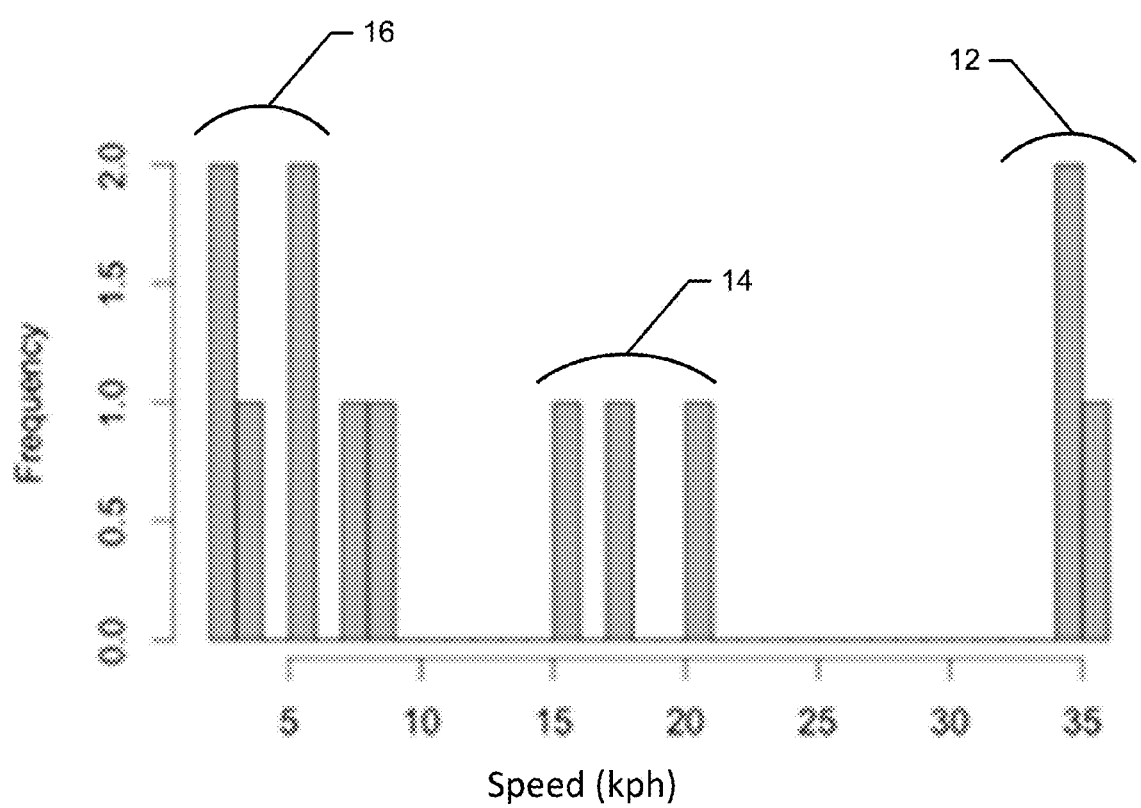
Figure 4:
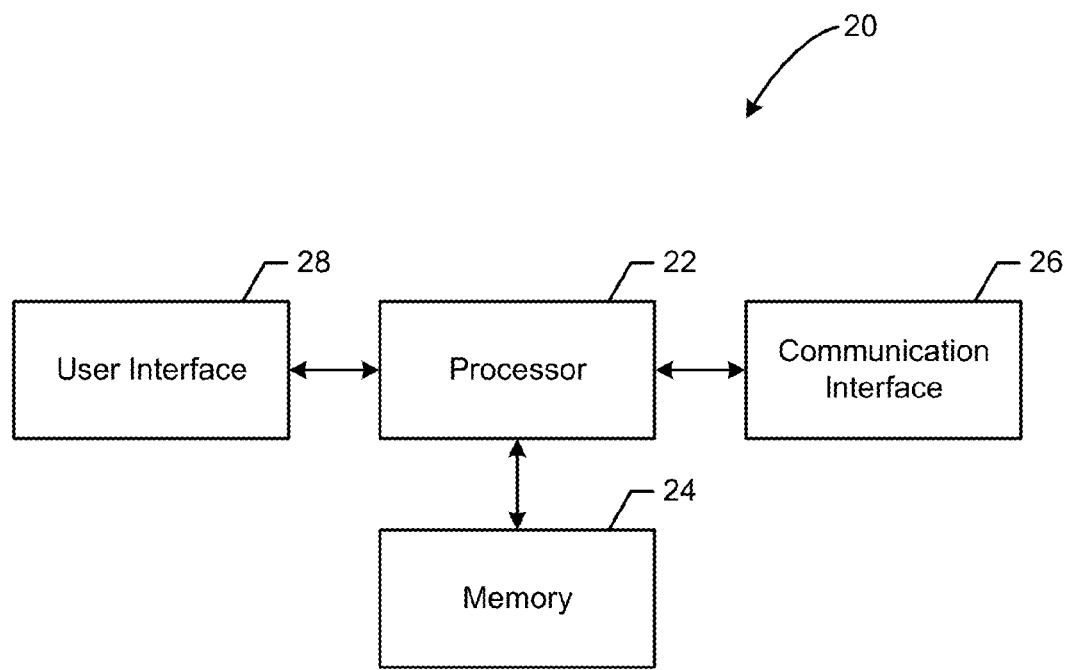
Figure 5:
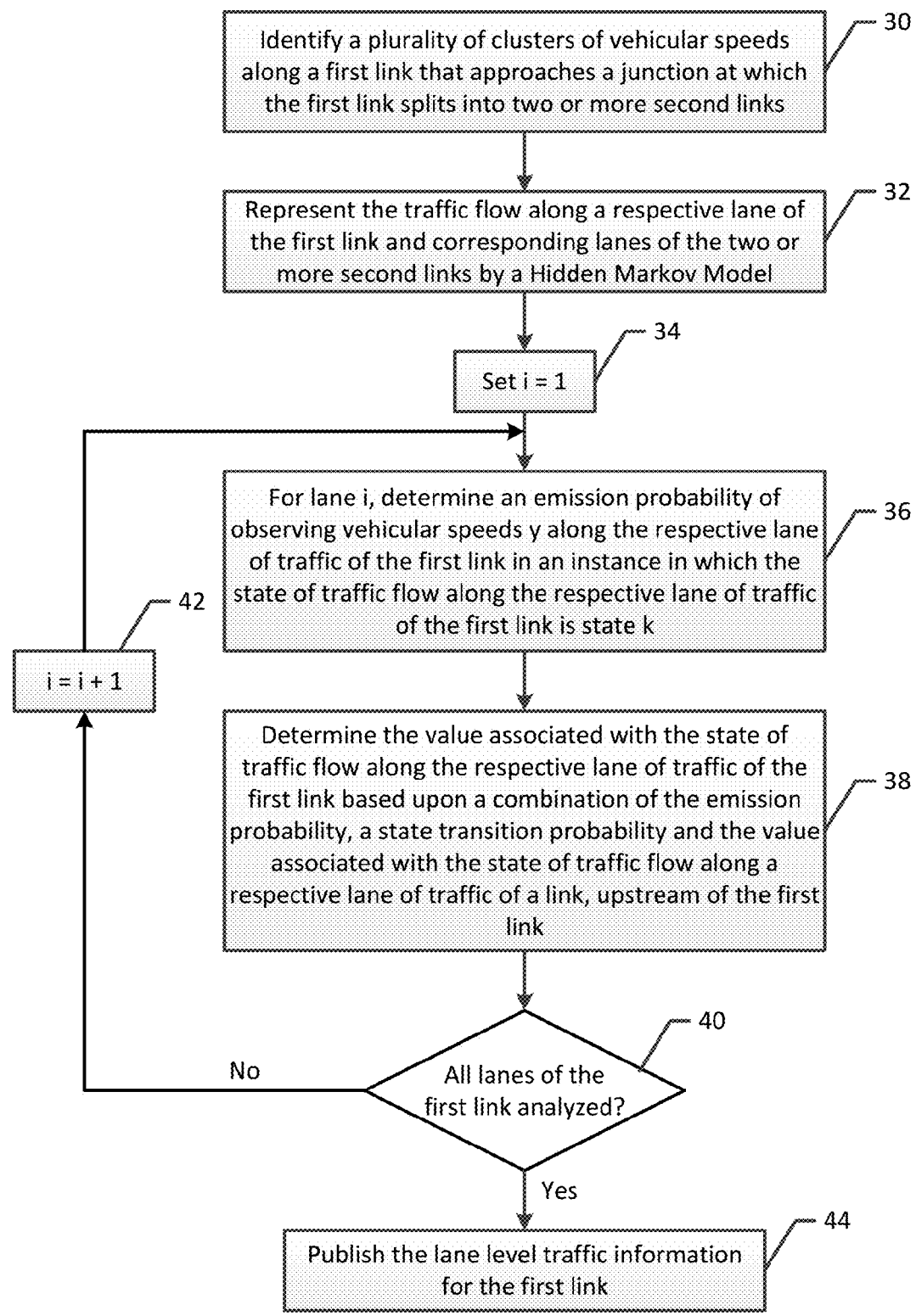
Figure 6:
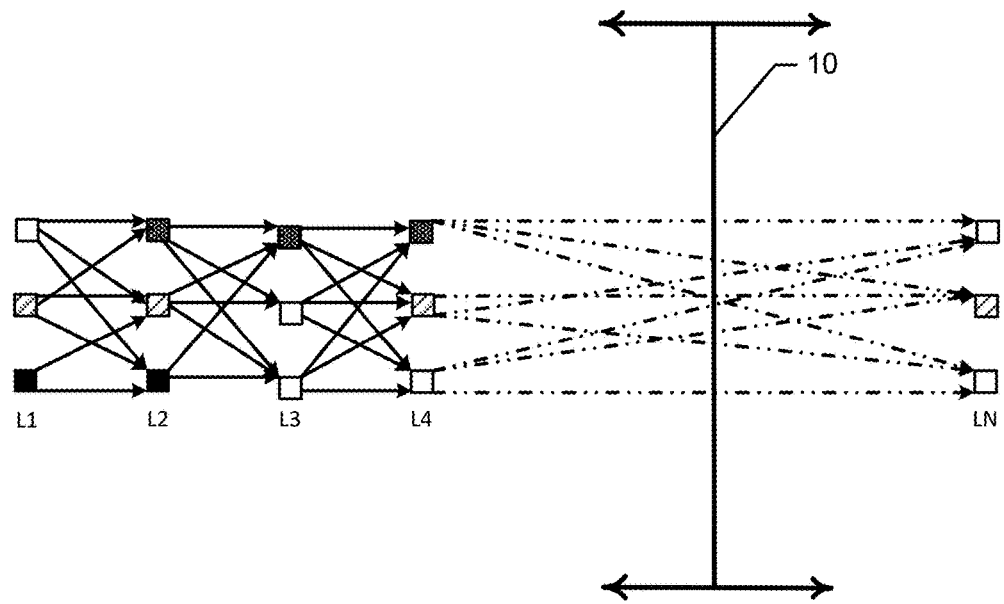
Figure 7:
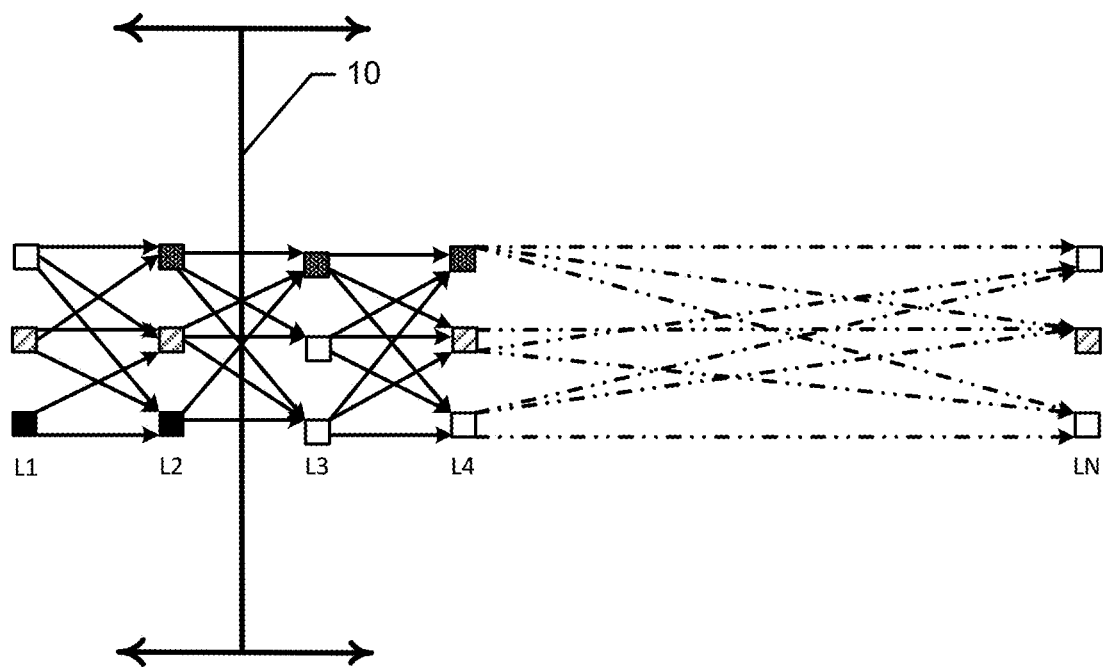

Having thus described certain example embodiments of the present disclosure in general terms, reference will hereinafter be made to the accompanying drawings, which are not necessarily drawn to scale, and wherein:

FIG. 1 is a representation of the links of roadways that intersect at a junction;

FIG. 2 is a more detailed representation of the links of the roadways of FIG. 1 that intersect at a junction with links L1 and L2 each including three lanes;

FIG. 3 is a graphical representation of a multi-modal distribution of vehicular speeds along a link of a roadway approaching a junction;

FIG. 4 is a block diagram illustrating an apparatus that may be specifically configured in accordance with an example embodiment of the present invention;

FIG. 5 is a block diagram of the operations performed, such as by the apparatus of FIG. 4, in accordance with an example embodiment of the present invention;

FIG. 6 is a graphical representation of a trellis diagram of a Hidden Markov Model that is representative of the potential states of traffic flow along different links proximate a junction in accordance with an example embodiment of the present invention;

FIG. 7 is a graphical representation of another trellis diagram of a Hidden Markov Model that is representative of the potential states of traffic flow along different links proximate a junction between links L2 and L3 in accordance with another example embodiment of the present invention; and FIGS. 8a and 8b are tabular comparisons of the respective states of traffic flow identified for different links proximate a junction in accordance with a conventional approach utilizing an average speed for a multi-modal speed distribution and an approach that is performed at the lane level utilizing a Viterbi algorithm in accordance with an example embodiment of the present invention.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

A method, apparatus and computer program product are provided in accordance with an example embodiment in order to evaluate traffic flow at a lane level along the link of a roadway approaching a junction. By evaluating the traffic flow at a lane level along the link of a roadway approaching a junction, routing and navigation systems may be provided with more accurate traffic information and, as such, may perform navigation services including route planning and determining estimated times of arrival with increased precision. Additionally or alternatively, routing and navigation systems may utilize the more accurate traffic information provided in accordance with the lane level analysis of the method, apparatus and computer program product of an example embodiment in order to perform navigation services in the form of directing an autonomous vehicle with increased precision as the autonomous vehicle approaches a junction such that the autonomous vehicle is positioned in the desired lane in order to most efficiently navigate the junction and to reduce the impact of the autonomous vehicle upon other drivers.

The method, apparatus and computer program product of an example embodiment provide lane-level analysis for a link of a roadway approaching a junction. The junction that is approached by a link of the roadway may be any of a variety of junctions in which a vehicle traveling along the roadway approaching the junction has the option of continuing along any one of two or more roads that intersect at the junction. In this regard, a junction may include a intersection of two or more roads as well as junctions defined by the splitting of one road from another road that continues past the junction, such as in the case of a on or off ramp splitting from a highway or other thoroughfare.

By way of example of a junction that may be subject to the lane level analysis provided by the method, apparatus and computer program product of an example embodiment, FIG. 1 depicts a junction 10 in the form of an intersection. As shown, a roadway comprised of at least two consecutive links designated L1 and L2 approaches the junction from a first direction. The roadway comprised of links L1 and L2 intersects with three other roadways at the junction such that a vehicle traveling along the roadway comprised of the links L1 and L2 can continue on link L4, turn right on link L3 or turn left on link L5. Although FIG. 1 illustrates one example of a junction in the form of an intersection, the junction approached by the link of the roadway that is analyzed at the lane level in accordance to an example embodiment of the present invention may be configured in a number of different manners.

The link of the roadway approaching the junction includes two or more lanes of traffic traveling in the same direction toward the junction. By way of example but not of limitation, FIG. 2 depicts the junction 10 of FIG. 1 with links L1 and L2 of the roadway approaching the junction being depicted in more detail. In this regard, each of link L1 and link L2 is shown to include three lanes, namely, a left lane, a center lane and a right lane. The corresponding lanes of sequentially adjacent links may define strands, such as the left lanes of links L1 and L2 may define a first strand, the center lanes of links L1 and L2 may define a second strand and the right lanes of links L1 and L2 may define a third strand since these lanes correspond by being positionally contiguous. Other roadways that approach junctions that are analyzed on a lane level in accordance with an example embodiment may include more or fewer lanes, but the link of the roadway that leads into the junction has at least two lanes of traffic traveling in the same direction toward the junction. Although different junctions have different traffic flow patterns, the junction depicted by way of example in FIG. 2 may define a traffic flow pattern in which traffic traveling along the left lane of link L1 turns left onto link L5, traffic traveling along this center lane of link L1 continues through the junction and thereafter travels along link L4 and traffic traveling along the right lane of link L1 turns right onto link L3.

At least partially as a result of the different traffic patterns established for the different lanes of the link of the roadway approaching a junction 10, the vehicular speed of the traffic along the different lanes may vary from one lane to another, at least during certain periods of time. For example, in instances in which the traffic flow is relatively heavy through the junction, the vehicles turning left from the left lane of link L1 to link L5 are generally more greatly delayed and thus have a slower speed than vehicles in the other lanes of link L1. Thus, the speed of vehicles traveling along the link of a roadway approaching a junction, such as link L1 in the example of FIGS. 1 and 2, may define a multi-modal distribution as shown in FIG. 3.

In this regard, the speed of vehicles traveling along the first link of the roadway approaching the junction may be provided as probe data consisting of a plurality of probe points. Probe points are frequently captured by global positioning systems ("GPS"), navigation systems or the like that are mounted in vehicles or are embodied by mobile devices, such as smartphones, tablets or other mobile terminals carried by passengers in a vehicle. Each probe point is associated with a location, such as may be expressed in terms of latitude and longitude. Some probe points are also associated with a heading and a speed at which the GPS system or the navigation system was moving at the time at which the probe point was captured. The probe data may be collected and stored and then subsequently analyzed as historical probe data. Alternatively, the probe data may be collected and analyzed in real time or near real time in order to determine a current assessment of the traffic flow through a junction.

As shown in FIG. 3, one example of a multi-modal vehicular speed distribution, such as may be created by traffic on the three lanes of link L1 approaching the junction 10, includes three different clusters of vehicular speed. A first cluster 12 of vehicular speeds is located about 35 kph, a second cluster 14 of vehicular speeds is about 15-20 kph and a third cluster 16 of vehicular speeds is below about 10 kph. As described below, the different clusters of vehicular speeds may be representative of different states of traffic flow and may, in turn, be associated with vehicles traveling along different lanes of the link of the roadway approaching the junction 10. The different states of traffic flow may be defined in different manners. In a first example, the states of traffic flow are defined to include a free flowing state, a slightly congested state and heavily congested state. The free flowing state, the slightly congested state and the heavily congested state may, in turn, be defined by different ranges of vehicular speeds, such as above x for the free flowing state, below y (where x>y) for the heavily congested state and between x and y for the slightly congested state. As a second example, the different states of traffic flow may be defined as different ranges of vehicular speeds, such as a first state for vehicular speeds between 0 and 10 kilometers per hour (kph), a second state for vehicular speeds between 10 and 20 kph, a third state for vehicular speeds between 20 and 30 kph, and so on.

In order to evaluate the traffic flow at a lane level in order to provide more accurate traffic information, such as for routing and navigation systems, an apparatus 20 is provided in accordance with an example embodiment as shown in FIG. 4. The apparatus may be embodied by a variety of computing devices including, for example, such as a navigation system, an advanced driver assistance system (ADAS), a GPS system or the like. Additionally or alternatively, the apparatus may be embodied in other types of computing devices, such as a server (such as the server of a traffic provider service), a personal computer, a computer workstation, a laptop computer, a plurality of networked computing devices or the like, that are configured to analyze probe points, such as for traffic estimation or other purposes. Regardless of the type of computing device that embodies the apparatus, the apparatus of an example embodiment may include, may be associated with or may otherwise be in communication with a processor 22 and a memory device 24 and optionally a communication interface 26 and/or a user interface 28.

In some embodiments, the processor 22 (and/or co-processors or any other processing circuitry assisting or otherwise associated with the processor) may be in communication with the memory device 24 via a bus for passing information among components of the apparatus 20. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As noted above, the apparatus 20 may be embodied by a computing device including those described above. However, in some embodiments, the apparatus may be embodied as a chip or chip set. In other words, the apparatus may comprise one or more physical packages (for example, chips) including materials, components and/or wires on a structural assembly (for example, a circuit board). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 22 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 22 may be configured to execute instructions stored in the memory device 24 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, the computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 20 of an example embodiment also optionally includes a communication interface 26 that may be any means such as a device or circuitry embodied in either hardware or a combination of hardware and software that is configured to receive and/or transmit data from/to other electronic devices in communication with the apparatus, such as by being configured to receive probe data from a database, cloud storage or other external memory device and/or to provide traffic information, including lane level speed information, to a routing and navigation system, a traffic service provider, an in-vehicle GPS, in-vehicle navigation system, a personal navigation device (PND), a portable navigation device or the like. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication.

As illustrated in FIG. 4, the apparatus 20 may also optionally include or otherwise be in communication with a user interface 28. The user interface may include a touch screen display, a keyboard, a mouse, a joystick or other input/output mechanisms. In some embodiments, the user interface, such as a display, speakers, or the like, may also be configured to provide output to the user. In this example embodiment, the processor 22 may comprise user interface circuitry configured to control at least some functions of one or more input/output mechanisms. The processor and/or user interface circuitry comprising the processor may be configured to control one or more functions of one or more input/output mechanisms through computer program instructions (for example, software and/or firmware) stored on a memory accessible to the processor (for example, memory device 24 and/or the like).

In order to provide for lane level analysis of the traffic flow along a link approaching a junction, reference is now made to FIG. 5 in which the operations performed, such as by the apparatus 20 of FIG. 4, are depicted. As shown in block 30 of FIG. 5, the apparatus 20 of an example embodiment includes means, such as the processor 22 or the like, for identifying a plurality of clusters of vehicular speeds from probe data along a first link that approaches a junction 10 at which the first link splits into two or more second links. The probe data ingested by the apparatus may be historical probe data that has been collected by a plurality of probes traveling along the first link and that has been provided to and stored by memory 24 or another database accessible by the apparatus. Additionally or alternatively, the probe data ingested by the apparatus may be collected and analyzed in real time or near real time. The vehicular speeds provided by the probe data may be analyzed, such as by the processor, in various manners in order to determine the distribution of vehicular speeds and to then cluster the vehicular speeds with each cluster of vehicular speeds being confined within a respective range for vehicular speeds. For example, the processor may implement a multi-modal detection and clustering algorithm so as to identify the plurality of clusters of vehicular speeds along the first link that approaches the junction.

Although various multi-modal detection and clustering algorithms may be utilized, one example of the pseudo code of a multi-modal detection and clustering algorithm that may be implemented by the processor 22 is as follows:

```
V ← {a set of probe speeds in an epoch}
function MDM(V):
    s ← STD(V)
    m ← mean(V)
    V ← V ∀ V < m + 2s & V > m − 2s  //first outlier filtering
    d ← Range(V) / 16
    for i ← 1 to 16 / /bucketizing
        b_i ← {V ∀ V < max(V) & V > (max(V) − d)}
        V ← V − b_i
    end for
    V ← b_1 + b_2 + ... + b_16 / /restore V
    MM ← 1
```

```
    for i ← 2 to 16 / /biased outlier rejection in favour of faster speeds
        MG ← (mean(b_1) − mean(b_i)) / Range(V)

if |b_1| > 2 and MG > 0.3 / /2 & 0.3 are tuning paramters
        then {
            MDC ← {MM,mean(b_1),MG}
            MM ← MM + 1
            b_1 ← b_i
        }
        else b_1 ← b_1 + b_i
        end if
    end for
    return MDC
end MDM
```

As shown in the foregoing pseudo code, probe points associated with speeds that are outliers, such as probe points associated with speeds that are more than two standard deviations away from the mean, may be filtered or eliminated. Thereafter, the remaining speeds associated with the probe points of the respective epoch may be separated into buckets $b_1, b_2, \ldots b_{16}$ and MG may be determined based upon the difference between the means of the various buckets as normalized fashion based upon the range. In this analysis, the normalized difference between the means of the different buckets may be subjected to various predefined conditions, such as $|b_1|>2$ and MG>0.3, with the predefined conditions defining tuning parameters that may be varied by the system designer to ensure the desired performance. For example, $|b_1|>2$ and BiM>0.2 in an alternative embodiment. In this regard, the tuning parameters may be selected so as to return a value representative of the multi-modality detection and clustering (MDC) which consists of an integer index count designated MM representative of the number of different speed clusters or speed states that have been identified, a mean of the respective bucket and the magnitude of a difference designated MG between one speed state and another.

As the traffic flow through a junction may vary over the course of time, the identification of the clusters of vehicular speeds from probe data and, indeed, the process depicted in FIG. 5 and described herein may be repeated for each of a plurality of different time epochs. In this regard, the probe data not only identifies the location of a probe point and various parameters, including the vehicular speed, associated with the probe point, but the probe data also generally includes the time, such as a time stamp, at which the probe data was collected. Thus, the probe data may be associated with different epochs depending upon the time associated with the probe point. Time epochs define different periods of time, but, in an example embodiment, each time epoch has the same length, such as five minutes. Thus, the lane level analysis described herein in conjunction with FIG. 5 may be repeated for each or at least a plurality of the time epochs so as to take into account variations in the traffic flow over the course of time.

In addition to determining the plurality of clusters of vehicle speeds from probe data along the first link that approaches the junction 10, the apparatus 20, such as the processor 22, may also determine the vehicular speed, such as the average vehicular speed, along each of the other links, hereinafter generally referenced as second links, that intersect with the first link at the junction, such as links L3, L4 and L5 in the example of FIGS. 1 and 2. This determination of the average speed along the second links may again be based upon probe data for vehicles traveling along the respective links.

Based upon the identification of a plurality of clusters of vehicular speeds from probe data along the first link that approaches the junction 10, the apparatus 20, such as the processor 20, may define a data object, such as an artifact, that identifies the link and that also identifies the vehicular speed associated with each of the plurality of clusters, such as the average vehicular speed of each cluster. The data object can also include additional information, such as the time epoch for which the plurality of clusters of vehicular speed were identified, the number of probe points that were utilized in the identification of the plurality of clusters of vehicular speed and the standard deviation associated with the vehicular speed of each cluster that has been identified. In an example embodiment, the data object also includes an identification of each of the second links that intersect the first link at the junction and the average speed along each of the second links. The data object may be stored in the memory 24 or another database accessible by the apparatus.

In an example embodiment, the apparatus 20, such as the processor 22, constructs the data object to also include direction information. Although the direction information may be expressed in various manners, a junction matrix may be defined for the junction. As shown below in relation to the junction of FIGS. 1 and 2, the junction matrix identifies each link that intersects at the junction and the bearing of the second links relative to the first link. As reflected in the example of a junction matrix below and with reference to the junction 10 of FIGS. 1 and 2, link L3 has a bearing of 90 degrees relative to link L1, link L4 has a bearing of 0 degrees relative to link L1 and link L5 has a bearing of 270 degrees relative to link L1.

|    | L1 | L2 | L3 | L4 | L5  |
|----|----|----|----|----|-----|
| L1 | —  | —  | 90 | 0  | 270 |
| L2 | 0  | —  | 90 | 0  | 270 |
| L3 | —  | —  | —  | —  | —   |
| L4 | —  | —  | —  | —  | —   |
| L5 | —  | —  | —  | —  | —   |

As shown, the junction matrix may be very sparse with many null values in an instance in which the network graph of FIGS. 1 and 2 is one directional. However, the junction matrix of an intersection supporting bi-directional traffic may be more complete. The data object may include the junction matrix or other representation of the direction information of the links that intersect at the junction.

In an example embodiment, the junction matrix or the data object itself can include additional parameters associated with the traffic flow through the junction 10. For example, the junction matrix or the data object itself can include travel times from one link to another (which may be utilized as a real-time turn cost), turning costs, average probe volume counts and the speed gradient. In this regard, the speed gradient is a ratio of the speed change from one link to another, such as the ratio of the speed along the upstream link to the speed along the downstream link. In this example, speed gradients that equal 1 are representative of there being no change in speed between the upstream and downstream links, a speed gradient of greater than 1 represents a deceleration in traversing from the upstream link to the downstream link and a speed gradient of less than 1 represents an acceleration in traversing from the upstream link to the downstream link.

The clusters of vehicular speeds are associated with different states of traffic flow along the first link. In this regard, the apparatus 20, such as the processor 22, is configured to associate each cluster of vehicular speeds with a respective state of traffic flow. As described above, the various states of traffic flow may be predefined such that the association of a cluster of vehicular speed with a respective state of traffic flow is based upon the respective state of traffic flow that corresponds to the vehicular speed of the respective cluster. For example, in instances in which the cluster of vehicular speeds lies within a range of vehicular speeds that defines a respective state of traffic flow, the apparatus, such as the processor, is configured to associate the cluster of vehicular speeds with the respective state of traffic flow.

In order to determine the state of traffic flow and, in turn, the cluster of vehicular speeds that is associated with each lane of the first link approaching the junction, the apparatus 20 of an example embodiment includes means, such as the processor 22 or the like, for modeling the set of probabilistic states representing the possible states of traffic flow for a respective lane along the first link as a Hidden Markov Model. See block 32 of FIG. 5. In this regard, an example trellis diagram representative of a Hidden Markov Model of the probabilistic states representing the possible states of traffic flow for a respective lane is depicted in FIG. 6. The trellis diagram represents different possible states of traffic flow on a contiguous set of lanes of links beginning with a lane of link L1 and continuing to the corresponding lane of link L. In this model, the links are the observation points for a respective lane and the different possible states of traffic flow represent the different clusters of vehicular speeds defined by the multi-modality distribution of vehicular speeds. The transition probabilities may be derived, such as by the processor, based on the behavior or probability of the traffic flow transitioning from one state to another state, such as from a free flowing state to a slightly congested state to a heavily congested state.

In the trellis diagram of FIG. 6, three possible states of traffic flow are represented, namely, a free flowing state as represented by speckled boxes, a slightly congested state as represented by cross-hatched boxes and a heavily congested state as represented by filled boxes. Boxes that are blank indicate that a state does not exist for traffic flow along the respective lane of the respective link. For example, the trellis diagram of FIG. 6 indicates that the respective lane of link L3 is associated with a free flowing state of traffic flow, while the corresponding lane of link L2 includes all three possible states of traffic flow. As such, the distribution of vehicular speeds along the respective lane of link L3 is not multi-modal and has only a single cluster of vehicular speeds, while the distribution of vehicular speeds along the corresponding lane of link L2 is multi-modal and has three different clusters of vehicular speeds. As also shown in FIG. 6, the distribution of speeds along the corresponding lanes of links L2 and L4 are bi-modal with two clusters of vehicular speeds.

The trellis diagram of FIG. 6 models an example in which the distribution of vehicular speeds is multi-modal prior to the junction. However, other examples may include a multi-modal distribution of vehicular speeds following the junction, such as in an instance in which one of the second links, such as link L4 of FIGS. 1 and 2 is immediately upstream of another intersection, that is, link L4 is not only downstream of the junction 10 of FIGS. 1 and 2, but is also immediately upstream of another junction. In this instance, the downstream link, such as link L4 in the foregoing example, would not have a homogenous speed distribution, but may also have a multi-modal speed distribution with multiple clusters of vehicular speeds. FIG. 7 depicts a trellis diagram modeled in accordance with a Hidden Markov Model in which a respective lane of the downstream links, such as the respective lane of link L4, also includes a multi-modal distribution of vehicular speeds. In the example of FIG. 7, the traffic flow via the respective lane of link L4 includes both a free flowing state of traffic flow and an intermediate state of traffic flow.

Based upon the multi-modal distribution of vehicular speeds along a multi-lane link approaching a junction 10, the apparatus 20, such as the processor 22, is configured to determine the most likely states of traffic flow along the different lanes of the first link. In this regard, the apparatus of an example embodiment includes means, such as the processor or the like, for determining, for a respective lane of traffic of the first link, a value $V_{l_i,k}$, such as a probability and, more particularly, an optimal probability, associated with the traffic having a respective state k of traffic flow from among the different states x of traffic flow associated with the clusters of vehicular speeds along the respective lane $l_i$ of traffic of the first link. In other words, from among the different states of traffic flow associated with the first link, the apparatus, such as the processor, is configured to determine the probability of a respective lane of the first link having a particular one of the states of traffic flow. Thus, the apparatus, such as the processor, is configured to associate the different states of traffic flow along the first link with respective lanes of the first link.

For a respective lane i as defined by block 34 of FIG. 5 and in order to determine the value $V_{l_i,k}$, such as the probability, associated with the traffic along the respective lane having a respective state of traffic flow, the apparatus 20 includes means, such as the processor 22 or the like, for determining an emission probability of observing vehicular speeds y along the respective lane of traffic of the first link in an instance in which the state of traffic along the respective lane of traffic of the first link is state k. See block 36. In this regard, the apparatus, such as the processor, is configured to determine the emission probability based upon a probability that the state of traffic flow along the respective lane of traffic of the first link is state k given the probe data, a probability of observing the vehicular speeds from the probe data along the respective lane of traffic of the first link and the historical probability that the state of traffic flow along the respective lane of traffic of the first link is state k at a time epoch corresponding to the time epoch during which the probe data was collected. In an example embodiment, the emission probability may be defined as $P(y_{l_i}|k)$ which represents the probability of observing probe speeds y on link $l_i$ given that the traffic state is k. In this regard, y represents the vehicular speeds of the probe data from link L1. The emission probability $P(y_{l_i}|k)$ can also be denoted as $P(\text{probes}(l_i)|k)$. In order to determine the emission probability, the apparatus, such as the processor, may determine the reverse conditional probability, namely, $P(k|\text{probes}(l_i))$, such that by use of Bayes theorem, the emission probability in the form of $P(\text{probes}(l_i)|k)$ may be defined as:

$$P(\text{probes}(l_i)|k) = \frac{P(k|\text{probes}(l_i))P(\text{probes}(l_i))}{P(k)}$$

In the foregoing equation, $P(\text{probes}(l_i))$ represents the probability of observing the exact set of vehicular speeds on link $l_i$. Since the value, such as the probability, determined by the apparatus 20, such as the processor 22, is maximized across the possible states x of traffic flow, $P(\text{probes}(l_i))$ is independent of the states of traffic flow of the links and, as a result, has a constant value. In the foregoing equation, $P(k|\text{probes}(l_i))$ represents the probability of having state k on link $l_i$ given the set of vehicular speeds from probe data and may be obtained from the actual vehicular speeds on link $l_i$ at the respective time, such as during the respective time epoch. In addition, P(k) represents the historical probability of having state k on link $l_i$ during the time epoch during which the traffic flow is being estimated.

Following the determination of the emission probability, the apparatus 20 of this example embodiment includes means, such as the processor 22 or the like, for determining the value $V_{l_i,k}$, such as the probability and, more preferably, the optimal probability, associated with the state k of traffic flow along the respective lane $l_i$ of traffic of the first link based upon a combination of the emission probability $P(y_{l_i}|k)$, a state transition probability $a_{x,k}$ and a value $V_{l_{i-1},k}$ associated with the state of traffic flow along the respective lane $l_{i-1}$ of traffic of a link, upstream of the first link, such as L2 in the example of FIGS. 1 and 2. In an example embodiment, the apparatus, such as the processor, is configured to determine the value associated with the traffic having a respective state of traffic flow along the respective lane of traffic of the first link by utilizing a Viterbi algorithm to determine the value $V_{l_i,k}$. In this example embodiment, the value $V_{l_i,k}$ associated with the traffic having the respective state k of traffic flow along the respective lane $l_i$ of traffic of the first link may be expressed as:

$$V_{l_i,k} = \max_{x \in X}(P(y_{l_i}|k) \cdot a_{x,k} \cdot V_{l_{i-1},x})$$

wherein X is the set of all possible sates of traffic flow and which may, in turn, be rewritten as a function of time t as:

$$V_{l_i,k}(t) = \max_{x \in X}\left(\frac{P(k|\text{probes}(l_i(t)))}{P(k(t))} \cdot a_{x,k} \cdot V_{l_{i-1},x}(t)\right)$$

The state transition probability $a_{x,k}$ defines a probability of a change in state from a state of traffic flow along a corresponding lane of a link, upstream of the first link, to state k representative of the traffic flow along the respective lane of traffic of a first link. The state transition probability $a_{x,k}$ may be based on historical or imputed information that defines the likelihood of different changes in state. For example, the transition probability $a_{x,k}$ may indicate that it is more likely to change from a free flowing state to a slightly congested state than from a free flowing state to a heavily congested state. In addition, the value $V_{l_{i-1},k}$ associated with the state of traffic flow along the respective lane of traffic of a link, upstream of the first link, may be the value, such as the probability and, more particularly, the optimal probability, associated with the state of traffic flow along the respective lane of traffic of the link immediately upstream of the first link and, as such, may be determined as described herein with respect to value $V_{l_i,k}$ albeit for link $l_{i-1}$. By determining the value $V_{l_i,k}$ associated with the traffic having a respective state of traffic flow along the respective lane of traffic of the first link by maximizing the foregoing equations for $V_{l_i,k}$, the state of traffic flow that has the greatest probability of being associated with the respective lane of traffic of the first link that is being analyzed is determined.

The foregoing process is repeated for each lane of the first link. For example, the apparatus 20 includes means, such as the processor 22 or the like, for repeatedly determining the value associated with the traffic having a respective state of traffic flow from among the different states of traffic flow associated with the clusters of vehicular speeds for each different lane of traffic of the first link. In the embodiment of FIG. 5, the apparatus, such as the processor, is configured to determine whether all lanes of the first link have been analyzed. See block 40. If not, the apparatus, such as the processor selects the next lane to be analyzed, such as by incrementing the lane count, e.g., i=i+1, as shown in block 42 and then repeats the foregoing process as described above with respect to blocks 36 and 38 of FIG. 5. Thus, the apparatus, such as the processor, repeats the determination of the value associated with the traffic having a respective state of traffic flow along a respective lane of traffic of a first link for each different lane of traffic of the first link. As a result, the apparatus, such as the processor, identifies the state of traffic flow along the first link that has the greatest probability of being associated each different lane of the first link.

As described above, the determination of the value associated with the traffic having a respective state of traffic flow along a respective lane of traffic of a first link is based, in part, upon the value associated with the state of traffic flow along a respective lane of traffic of a link, upstream of the first link. In an instance in which the link that is being subjected to lane level analysis is the initial link of a set of links, the apparatus 20, such as the processor 22, may be unable to identify a link upstream of the link being analyzed. Thus, the apparatus, such as the processor, is configured to determine the value associated with the traffic having a respective state of traffic flow along the respective lane of traffic of the link in a different manner.

In this embodiment in which the first and second links are members of a set of sequential links extending from an initial link to a final link, the apparatus 20 includes means, such as the processor 22 or the like, for determining, for a respective lane of traffic of the initial link, a value $V_{l_1,k}$ associated with the traffic having a respective state of traffic flow along the respective lane of traffic of the initial link. In order to determine the value for the initial link, the apparatus of an example embodiment includes means, such as the processor or the like, for determining an emission probability $P(y_{l_1}|k)$ of observing vehicular speeds y along the respective lane of traffic of the initial link in an instance in which the state of traffic flow along the respective lane of traffic of the initial link is state k. The apparatus also includes means, such as the processor or the like, for determining the value associated with the state of traffic flow along the respective lane of traffic of the initial link based upon a combination of the emission probability and an initial probability $\pi_k$ of the state of traffic flow along the respective lane of traffic of the initial link being state k. The initial probability $\pi_k$ is based upon historical data and defines the traffic flow anticipated for the road segment during the respective time epoch of a typical day. For example, the value associated with the state of traffic flow along the respective lane of traffic of the initial link may be defined as:

$$V_{l_1,k} = (P(y_{l_1}|k) \cdot \pi_k)$$

Once the probabilities of the different states of traffic flow along the first link have been defined for the various lanes of traffic flow along the first link, the apparatus 20 includes means, such as the processor 22, the communication interface 26 or the like, for publishing the lane level traffic information for the first link. See block 44 of FIG. 5. The publication of the traffic information allows the traffic information to be stored, such as by memory 24 or by another database, such as a database of a traffic service provider. The publication of the traffic information may also provide the traffic information to a routing or navigation system that utilizes this traffic information to define a route, such as a fastest route, more precisely or to determine an estimated time of arrival more accurately.

In this regard, the association of a state of traffic flow with a respective lane of a link approaching a junction 10 permits a respective cluster of vehicular speeds and, therefore, a speed or a range of speeds to be associated with the respective lane of the link approaching the junction. For a first link having three lanes as shown in FIG. 2 and a multi-modal distribution of vehicular speeds as show in FIG. 3, a free flowing state of traffic flow may be associated with the center lane, a slightly congested state of traffic flow may be associated with a right lane and a heavily congested state of traffic flow may be associated with the left lane of the first link. Based upon the plurality of clusters of vehicular speeds identified from the probe data associated with the first link, the speed of vehicles traveling in the center lane of the first link may therefore be defined as 35 kph, the speed for vehicles traveling in the right lane of the first link may be defined as 15-20 kph and the speed of vehicles traveling along the left lane of the first link may be defined as below 10 kph. Thus, the vehicular speeds associated with the different lanes of the first link more accurately represent the actual traffic flow through the respective lanes of the first link and is more precise than an overall average of the aggregated vehicular speeds along the first link being applied equally to all lanes of the first link.

For example, FIG. 8a provides a comparison of the state of traffic flow (G represents a free flowing state, Y represents a slightly congested state and R represents a highly congested state) associated with a respective lane of eleven links designated 1, 2, . . . 10, 11 that was determined by a conventional "mean-based" approach in which an overall average of the aggregated vehicular speeds for all lanes of a link is utilized to predict the state of traffic flow and was also determined by utilizing a Viterbi algorithm to perform a lane level analysis. In this example, link 6 is the only one of the eleven links that exhibits a multi-modal speed distribution. Thus, links 1-5 and 7-11 have the same states with each approach as the lane level analysis of example embodiments of the present invention only provides distinct results when confronted with a multi-modal distribution of vehicular speeds. With respect to link 6, an analysis of the probe data generated a bi-modal distribution of vehicular speeds—one cluster associated with a free flowing state and another cluster associated with a heavily congested state. Utilizing a mean-based approach, the free flowing and heavily congested states averaged to a slightly congested state as shown in FIG. 8a. Primarily due to the upstream and downstream links, namely, links 5 and 7, having freely flowing states, application of the Viterbi algorithm in accordance with an example embodiment determines that the most likely state of link 6 is also a freely flowing state as shown in FIG. 8a. In this contest, it is possible that another lane of link 6 (different than the lane analyzed for purposes of FIG. 8a) could be heavily congested and correspondingly produce the cluster of slower vehicular speeds.

Another example is provided by FIG. 8b in which a different lane of the eleven links is analyzed. For at least some of the links, the lane analyzed in FIG. 8b is a left turn lane which generally experiences more congestion and incurs more delays, at least during peak traffic conditions. With respect to FIG. 8b, at least six links, links 1, 3, 4, 5 and 6, exhibit multi-modal behavior in terms of the vehicular speeds. For links 4, 5 and 6, the mean-based approach determined that the state was slightly congested by averaging one cluster associated with higher speeds and another cluster associated with lower speeds. However, the application of the Viterbi algorithm in accordance with an example embodiment determines that the state most likely associated with the respective lane of links 4, 5 and 6 is the more heavily congested state, particularly in light of the upstream and downstream links, namely, links 3 and 7 being determined to be at least slightly congested.

Thus, in the context of route planning in which a fastest route is to be identified, a routing system can determine the appropriate lane for a vehicle to travel when approaching a junction and, as a result, may more accurately determine the required to travel through the junction based upon the speed associated with the respective lane, thereby leading to more accurate estimations of the time required to for different routes. Thus, different routes may be more accurately compared by the routing system in order to identify the fastest route and the estimated time of arrival may be more accurately determined based upon the more specific lane-level information provided in accordance with example embodiments of the present invention. Thereafter, while a vehicle is traveling along the route, a navigation system may identify the lane of the first link through which the vehicle should travel and provide corresponding directions to the driver.

In an example embodiment in which the apparatus 20 is embodied by a routing or navigation system, the apparatus also includes means, such as the processor 22 or the like, for utilizing the values associated with the traffic having a respective state of traffic flow for each different lane of traffic of a first link and/or the vehicular speeds associated with the respective states of traffic flow in order to define a route and/or estimate the time of arrival. As such, the apparatus of an example embodiment includes means, such as the processor or the like, for determining a route of travel, such as a fastest route of travel, based upon the vehicular speeds associated with the respective states of traffic flow that were determined to be most likely for each different lane of traffic of a first link approaching a junction. Additionally or alternatively, the apparatus of an example embodiment includes means, such as the processor or the like, for estimating an estimated time of arrival based upon the vehicular speeds associated with the respective states of traffic flow that were determined to be most likely for each different lane of traffic of a first link approaching a junction.

In another example embodiment, the traffic information including the probabilities of the states of traffic flow associated with the different lanes are the first link and the corresponding vehicular speeds associated with the different states of traffic flow may be utilized in order to develop enhanced guidance for an autonomous vehicle. In this regard, a routing system may define a route for an autonomous vehicle such that the autonomous vehicle utilizes the appropriate lane of the first link in order to advance through the junction in the desired manner, such as in the quickest manner, without creating a disturbance for other drivers.

The foregoing process may be repeated for each lane of a plurality of different links that experience multi-modality speed distribution while approaching a junction. For each such link, the process may also be repeated for each time epoch during which the vehicular speeds define a multi-modality distribution. In contrast, links that do not exhibit a multi-modality distribution during a respective time epoch need not be analyzed in the manner described above as the link does not support different states of traffic flow, at least during the respective time epoch.

FIG. 5 illustrates a flowchart of an apparatus, method and computer program product according to example embodiments of the invention. It will be understood that each block of the flowchart, and combinations of blocks in the flowchart, may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 24 of an apparatus 20 employing an embodiment of the present invention and executed by a processor 22 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included, some of which have been described above. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims.

Although specific terms are employed herein, they are used in a generic and descriptive sense only and not for purposes of limitation.

That which is claimed:

1. A navigation system comprising:
a communication interface configured to receive probe data along a first link that approaches a junction at which the first link splits into two or more second links, wherein the first link comprises two or more lanes of traffic, and wherein the first and second links are members of a set of sequential links;
at least one processor configured to:
identify a plurality of clusters of vehicular speeds from the probe data along the first link, wherein the clusters of vehicular speeds are associated with different states of traffic flow along the first link;
for a respective lane of traffic of the first link, determining a value associated with the traffic having a respective state of traffic flow from among the different states of traffic flow associated with the clusters of vehicular speeds along the respective lane of traffic of the first link by:
determining an emission probability of observing vehicular speeds (y) along the respective lane of traffic of the first link in an instance in which the state of traffic flow along the respective lane of traffic of the first link is state (k); and
determining the value associated with the state of traffic flow along the respective lane of traffic of the first link based upon a combination of the emission probability, a state transition probability and the value associated with the state of traffic flow along a respective lane of traffic of a link, upstream of the first link; and
repeatedly determining the value associated with the traffic having a respective state of traffic flow from among the different states of traffic flow associated with the clusters of vehicular speeds for each different lane of traffic of the first link,
wherein the at least one processor is also configured to perform navigation services based upon the value associated with the traffic having a respective state of traffic flow from among the different states of traffic flow associated with the clusters of vehicular speeds for each different lane of traffic of the first link,
wherein the at least one processor of the navigation system is configured to perform navigation services comprising at least one of defining a route, estimating a time of arrival or providing guidance to an autonomous vehicle along the set of sequential links including the first and second links based upon the value associated with the traffic having the respective state of traffic flow from among the different states of traffic flow associated with the clusters of vehicular speeds for each different lane of traffic of the first link.

2. A navigation system according to claim 1 wherein the set of sequential links extends from an initial link to a final link, and wherein the method further comprises determining, for a respective lane of traffic of the initial link, a value associated with the traffic having a respective state of traffic flow along the respective lane of traffic of the initial link by:
determining an emission probability of observing vehicular speeds (y) along the respective lane of traffic of the initial link in an instance in which the state of traffic flow along the respective lane of traffic of the initial link is state (k); and
determining the value associated with the state of traffic flow along the respective lane of traffic of the initial link based upon a combination of the emission probability and an initial probability ($\pi_k$) of the state of traffic flow along the respective lane of traffic of the initial link being state (k).

3. A method implemented by a navigation system, the method comprising:
identifying a plurality of clusters of vehicular speeds from probe data along a first link that approaches a junction at which the first link splits into two or more second links, wherein the first link comprises two or more lanes of traffic, wherein the first and second links are members of a set of sequential links and wherein the clusters of vehicular speeds are associated with different states of traffic flow along the first link;
for a respective lane of traffic of the first link, determining a value associated with the traffic having a respective state of traffic flow from among the different states of traffic flow associated with the clusters of vehicular speeds along the respective lane of traffic of the first link by:
determining an emission probability of observing vehicular speeds (y) along the respective lane of traffic of the first link in an instance in which the state of traffic flow along the respective lane of traffic of the first link is state (k); and
determining the value associated with the state of traffic flow along the respective lane of traffic of the first link based upon a combination of the emission probability, a state transition probability and the value associated with the state of traffic flow along a respective lane of traffic of a link, upstream of the first link;
repeatedly determining the value associated with the traffic having a respective state of traffic flow from among the different states of traffic flow associated with the clusters of vehicular speeds for each different lane of traffic of the first link; and
performing, with at least one processor of the navigation system, navigation services comprising at least one of defining a route, estimating a time of arrival or providing guidance to an autonomous vehicle along the set of sequential links including the first and second links based upon the value associated with the traffic having the respective state of traffic flow from among the different states of traffic flow associated with the clusters of vehicular speeds for each different lane of traffic of the first link.

4. A method according to claim 3 wherein determining the emission probability comprises determining the emission probability based upon a probability that the state of traffic flow along the respective lane of traffic of the first link is state (k) given the probe data, a probability of observing the vehicular speeds from the probe data along the respective lane of traffic of the first link and a historical probability the state of traffic flow along the respective lane of traffic of the first link is state (k) at a time epoch corresponding to the time epoch during which the probe data was collected.

5. A method according to claim 3 wherein the state transition probability defines a probability of a change in state from a state of traffic flow along a corresponding lane of a link, upstream of the first link, to state (k) representative of the traffic flow along the respective lane of traffic of the first link.

6. A method according to claim 3 wherein the value associated with the state of traffic flow along the respective lane of traffic of a link, upstream of the first link, comprises the value associated with the state of traffic flow along the respective lane of traffic of the link immediately upstream of the first link.

7. A method according to claim 3 wherein the set of sequential links extends from an initial link to a final link, and wherein the method further comprises determining, for a respective lane of traffic of the initial link, a value associated with the traffic having a respective state of traffic flow along the respective lane of traffic of the initial link by:
determining an emission probability of observing vehicular speeds (y) along the respective lane of traffic of the initial link in an instance in which the state of traffic flow along the respective lane of traffic of the initial link is state (k); and
determining the value associated with the state of traffic flow along the respective lane of traffic of the initial link based upon a combination of the emission probability and an initial probability ($\pi_k$) of the state of traffic flow along the respective lane of traffic of the initial link being state (k).

8. A method according to claim 3 wherein determining the value associated with the traffic having a respective state of traffic flow along the respective lane of traffic of the first link comprises utilizing a Viterbi algorithm to determine the value.

9. A method according to claim 3 further comprising representing the traffic flow along the respective lane of the first link and corresponding lanes of the two or more second links by a Hidden Markov Model, and wherein determining the value associated with the traffic having a respective state of traffic flow along the respective lane of traffic of the first link comprises determining the value based upon the Hidden Markov Model.

10. An apparatus of a navigation system comprising at least one processor and at least one memory including computer program instructions, the at least one memory and the computer program instructions, with the at least one processor, causing the apparatus at least to:
identify a plurality of clusters of vehicular speeds from probe data along a first link that approaches a junction at which the first link splits into two or more second links, wherein the first link comprises two or more lanes of traffic, wherein the first and second links are members of a set of sequential links and wherein the clusters of vehicular speeds are associated with different states of traffic flow along the first link;
for a respective lane of traffic of the first link, determine a value associated with the traffic having a respective state of traffic flow from among the different states of traffic flow associated with the clusters of vehicular speeds along the respective lane of traffic of the first link by:
determining an emission probability of observing vehicular speeds (y) along the respective lane of traffic of the first link in an instance in which the state of traffic flow along the respective lane of traffic of the first link is state (k); and
determining the value associated with the state of traffic flow along the respective lane of traffic of the first link based upon a combination of the emission probability, a state transition probability and the value associated with the state of traffic flow along a respective lane of traffic of a link, upstream of the first link;
repeatedly determine the value associated with the traffic having a respective state of traffic flow from among the different states of traffic flow associated with the clusters of vehicular speeds for each different lane of traffic of the first link; and
perform navigation services comprising at least one of defining a route, estimating a time of arrival or providing guidance to an autonomous vehicle along the set of sequential links including the first and second links based upon the value associated with the traffic having the respective state of traffic flow from among the different states of traffic flow associated with the clusters of vehicular speeds for each different lane of traffic of the first link.

11. An apparatus according to claim 10 wherein the at least one memory and the computer program instructions, with the at least one processor, cause the apparatus to determine the emission probability by determining the emission probability based upon a probability that the state of traffic flow along the respective lane of traffic of the first link is state (k) given the probe data, a probability of observing the vehicular speeds from the probe data along the respective lane of traffic of the first link and a historical probability the state of traffic flow along the respective lane of traffic of the first link is state (k) at a time epoch corresponding to the time epoch during which the probe data was collected.

12. An apparatus according to claim 10 wherein the state transition probability defines a probability of a change in state from a state of traffic flow along a corresponding lane of a link, upstream of the first link, to state (k) representative of the traffic flow along the respective lane of traffic of the first link.

13. An apparatus according to claim 10 wherein the value associated with the state of traffic flow along the respective lane of traffic of a link, upstream of the first link, comprises the value associated with the state of traffic flow along the respective lane of traffic of the link immediately upstream of the first link.

14. An apparatus according to claim 10 wherein the set of sequential links extends from an initial link to a final link, and wherein the at least one memory and the computer program instructions, with the at least one processor, further cause the apparatus to determine, for a respective lane of traffic of the initial link, a value associated with the traffic having a respective state of traffic flow along the respective lane of traffic of the initial link by:
determining an emission probability of observing vehicular speeds (y) along the respective lane of traffic of the initial link in an instance in which the state of traffic flow along the respective lane of traffic of the initial link is state (k); and
determining the value associated with the state of traffic flow along the respective lane of traffic of the initial link based upon a combination of the emission probability and an initial probability $\pi k$ of the state of traffic flow along the respective lane of traffic of the initial link being state (k).

15. An apparatus according to claim 10 wherein the at least one memory and the computer program instructions, with the at least one processor, cause the apparatus to determine the value associated with the traffic having a respective state of traffic flow along the respective lane of traffic of the first link by utilizing a Viterbi algorithm to determine the value.

16. An apparatus according to claim 10 wherein the at least one memory and the computer program instructions, with the at least one processor, further cause the apparatus to represent the traffic flow along the respective lane of the first link and corresponding lanes of the two or more second links by a Hidden Markov Model, and wherein the at least one memory and the computer program instructions, with the at least one processor, cause the apparatus to determine the value associated with the traffic having a respective state of traffic flow along the respective lane of traffic of the first link by determining the value based upon the Hidden Markov Model.

17. A computer program product comprising at least one non-transitory computer-readable storage medium bearing computer program instructions embodied therein, the computer program instructions comprising program instructions which, when executed by at last one processor of a navigation system, cause the at least one processor of the navigation system at least to:

identify a plurality of clusters of vehicular speeds from probe data along a first link that approaches a junction at which the first link splits into two or more second links, wherein the first link comprises two or more lanes of traffic, wherein the first and second links are members of a set of sequential links and wherein the clusters of vehicular speeds are associated with different states of traffic flow along the first link;

for a respective lane of traffic of the first link, determine a value associated with the traffic having a respective state of traffic flow from among the different states of traffic flow associated with the clusters of vehicular speeds along the respective lane of traffic of the first link by:

determining an emission probability of observing vehicular speeds (y) along the respective lane of traffic of the first link in an instance in which the state of traffic flow along the respective lane of traffic of the first link is state (k); and determining the value associated with the state of traffic flow along the respective lane of traffic of the first link based upon a combination of the emission probability, a state transition probability and the value associated with the state of traffic flow along a respective lane of traffic of a link, upstream of the first link;

repeatedly determine the value associated with the traffic having a respective state of traffic flow from among the different states of traffic flow associated with the clusters of vehicular speeds for each different lane of traffic of the first link; and perform navigation services comprising at least one of defining a route, estimating a time of arrival or providing guidance to an autonomous vehicle along the set of sequential links including the first and second links based upon the value associated with the traffic having the respective state of traffic flow from among the different states of traffic flow associated with the clusters of vehicular speeds for each different lane of traffic of the first link.

18. A computer program product according to claim 17 wherein the program instructions configured to determine the emission probability comprise program instructions configured to determine the emission probability based upon a probability that the state of traffic flow along the respective lane of traffic of the first link is state (k) given the probe data, a probability of observing the vehicular speeds from the probe data along the respective lane of traffic of the first link and a historical probability the state of traffic flow along the respective lane of traffic of the first link is state (k) at a time epoch corresponding to the time epoch during which the probe data was collected.

19. A computer program product according to claim 17 wherein the state transition probability defines a probability of a change in state from a state of traffic flow along a corresponding lane of a link, upstream of the first link, to state (k) representative of the traffic flow along the respective lane of traffic of the first link.

20. A computer program product according to claim 17 wherein the value associated with the state of traffic flow along the respective lane of traffic of a link, upstream of the first link, comprises the value associated with the state of traffic flow along the respective lane of traffic of the link immediately upstream of the first link.

21. A computer program product according to claim 17 wherein the set of sequential links extends from an initial link to a final link, and wherein the computer program instructions further comprise program instructions which, when executed, cause the computer to determine, for a respective lane of traffic of the initial link, a value associated with the traffic having a respective state of traffic flow along the respective lane of traffic of the initial link by:

determining an emission probability of observing vehicular speeds (y) along the respective lane of traffic of the initial link in an instance in which the state of traffic flow along the respective lane of traffic of the initial link is state (k); and determining the value associated with the state of traffic flow along the respective lane of traffic of the initial link based upon a combination of the emission probability and an initial probability ($\pi_k$) of the state of traffic flow along the respective lane of traffic of the initial link being state (k).

22. A computer program product according to claim 17 wherein the program instructions configured to determine the value associated with the traffic having a respective state of traffic flow along the respective lane of traffic of the first link comprise program instructions configured to utilize a Viterbi algorithm to determine the value.

* * * * *

UNITED STATES PATENT AND TRADEMARK OFFICE
CERTIFICATE OF CORRECTION

PATENT NO. : 10,198,941 B2
APPLICATION NO. : 15/221147
DATED : February 5, 2019
INVENTOR(S) : James Fowe Page 1 of 1

It is certified that error appears in the above-identified patent and that said Letters Patent is hereby corrected as shown below:

In the Claims

Column 24
Line 53, Claim 14 "πk" should read -- $\pi_k$ --

Signed and Sealed this
Nineteenth Day of November, 2019

Andrei Iancu
*Director of the United States Patent and Trademark Office*